(12) United States Patent
Shao et al.

(10) Patent No.: US 12,392,456 B2
(45) Date of Patent: Aug. 19, 2025

(54) PIPELINE MONITORING METHODS AND INTERNET OF THINGS BASED ON SMART GAS PIPELINE NETWORK SAFETY

(71) Applicant: CHENGDU QINCHUAN IOT TECHNOLOGY CO., LTD., Sichuan (CN)

(72) Inventors: Zehua Shao, Chengdu (CN); Yaqiang Quan, Chengdu (CN); Guanghua Huang, Chengdu (CN); Haitang Xiang, Chengdu (CN); Yuefei Wu, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 459 days.

(21) Appl. No.: 18/051,006

(22) Filed: Oct. 30, 2022

(65) Prior Publication Data

US 2023/0083626 A1 Mar. 16, 2023

(30) Foreign Application Priority Data

Oct. 11, 2022 (CN) .......................... 202211238334.3

(51) Int. Cl.
  *F17D 5/00* (2006.01)
  *G06N 20/00* (2019.01)
(52) U.S. Cl.
  CPC ............ *F17D 5/005* (2013.01); *G06N 20/00* (2019.01)

(58) Field of Classification Search
  None
  See application file for complete search history.

(56) References Cited

U.S. PATENT DOCUMENTS

| | | | |
|---|---|---|---|
| 7,761,496 B2 * | 7/2010 | Tarabzouni | G06F 16/29 709/200 |
| 2011/0184670 A1 * | 7/2011 | Wang | H04Q 9/00 702/51 |
| 2012/0209653 A1 * | 8/2012 | Andoji | G06Q 10/0639 705/7.26 |

(Continued)

FOREIGN PATENT DOCUMENTS

| | | | | |
|---|---|---|---|---|
| CN | 107606489 A | * | 1/2018 | |
| CN | 108343844 A | * | 7/2018 | ............... F17D 5/02 |
| CN | 110185940 A | * | 8/2019 | ............... F17D 5/06 |

*Primary Examiner* — Daniel S Larkin
(74) *Attorney, Agent, or Firm* — METIS IP LLC (57) ABSTRACT

The present disclosure provides a pipeline monitoring method and Internet of Things system based on smart gas pipeline network safety. The method comprises: determining an inspection need of at least one gas pipeline segment based on pipeline characteristics and transportation characteristics; based on the inspection need of the at least one gas pipeline segment, determining at least one target pipeline segment; sending the at least one target pipeline segment to the smart gas data center, and further sending the target pipeline segment to the smart gas user platform based on the smart gas service platform; based on the at least one target pipeline segment, generating a remote control instruction and sending the remote control instruction to the smart gas data center, and based on the smart gas sensing network platform, sending the remote control instruction to the smart gas object platform to perform deep inspection.

20 Claims, 5 Drawing Sheets

(56) References Cited

U.S. PATENT DOCUMENTS

| | | | | |
|---|---|---|---|---|
| 2017/0185902 | A1* | 6/2017 | Kumar | G06N 20/00 |
| 2018/0275100 | A1* | 9/2018 | Sutherland | G05D 7/0676 |
| 2018/0300639 | A1* | 10/2018 | Abbas | G06N 20/00 |
| 2020/0309632 | A1* | 10/2020 | Shao | G01D 18/00 |
| 2021/0216852 | A1* | 7/2021 | Reece | G08B 29/20 |
| 2022/0163958 | A1* | 5/2022 | Shao | G05B 23/0283 |
| 2023/0027479 | A1* | 1/2023 | Shao | G16Y 10/35 |

* cited by examiner

PIPELINE MONITORING METHODS AND INTERNET OF THINGS BASED ON SMART GAS PIPELINE NETWORK SAFETY

CROSS-REFERENCE TO RELATED APPLICATIONS

This application claims priority of Chinese Patent Application No. CN202211238334.3, filed on Oct. 11, 2022, the contents of which are hereby incorporated by reference to its entirety.

TECHNICAL FIELD

This present disclosure involves the field of gas pipeline monitoring, and specially involves a pipeline monitoring method and Internet of Things system based on smart gas pipeline network safety.

BACKGROUND

Gas has the characteristics of being flammable and explosive, so its safety during transportation is extremely important, which puts forward high requirements for the reliability of gas conveying pipelines. In order to ensure the safety of gas transportation, the gas pipeline is required to be conducted and inspected regularly, which consumes greater manpower, material resources, and time. In addition, some pipeline failures may not be discovered and dealt with as soon as possible.

Therefore, it is hoped to provide a pipeline monitoring method and the Internet of Things system based on smart gas pipeline network safety, which can dynamically monitor the state of gas pipelines and determine a pipeline segment that requires key maintenance to improve the efficiency of gas pipeline monitoring.

SUMMARY

One or more embodiments of this present disclosure provide a pipeline monitoring method based on smart gas pipeline network safety. A pipeline monitoring Internet of Things system based on smart gas pipeline network safety, wherein the Internet of Things system comprises a smart gas user platform, a smart gas service platform, a smart gas pipeline network safety management platform, a smart gas sensing network platform and a smart gas object platform interacting in sequence, the smart gas pipeline network safety management platform includes a smart gas data center and a smart gas pipeline network inspection management sub-platform, wherein the method is performed by the smart gas pipeline safety management platform, including: by the smart gas pipeline network inspection management sub-platform, obtaining pipeline characteristics and the transportation characteristics of the at least one gas pipeline segment in the preset area from the smart gas data center, and determining an inspection need of the at least one gas pipeline segment based on the pipeline characteristics and the transportation characteristics; based on the inspection need of the at least one gas pipeline segment, determining at least one target pipeline segment; sending the at least one target pipeline segment to the smart gas data center, and further sending the at least one target pipeline segment to the smart gas user platform based on the smart gas service platform; based on the at least one target pipeline segment, generating a remote control instruction and sending the remote control instruction to the smart gas data center, based on the smart gas sensing network platform, sending the remote control instruction to the smart gas object platform to perform deep inspection.

One embodiment of this present disclosure provides a pipeline monitoring Internet of Things based on smart gas pipeline network safety, wherein the Internet of Things system comprises a smart gas user platform, a smart gas service platform, a smart gas pipeline network safety management platform, a smart gas sensing network platform and a smart gas object platform interacting in sequence, the smart gas pipeline network safety management platform includes a smart gas data center and a smart gas pipeline network inspection management sub-platform, wherein the smart gas data center is configured to obtain, based on the smart gas sensing network platform, transportation characteristics of at least one gas pipeline segment from inspection equipment corresponding to the at least one gas pipeline segment in a preset area, wherein the gas inspection equipment is configured in the smart gas object platform; the smart gas pipeline network inspection management sub-platform is configured to: obtain pipeline characteristics and the transportation characteristics of the at least one gas pipeline segment in the preset area from the smart gas data center, and determine an inspection need of the at least one gas pipeline segment based on the pipeline characteristics and the transportation characteristics; based on the inspection need of the at least one gas pipeline segment, determine at least one target pipeline segment; send the at least one target pipeline segment to the smart gas data center, and further send the at least one target pipeline segment to the smart gas user platform based on the smart gas service platform; based on the at least one target pipeline segment, generate a remote control instruction and send the remote control instruction to the smart gas data center, based on the smart gas sensing network platform, send the remote control instruction to the smart gas object platform to perform deep inspection.

One or more embodiments of this present disclosure provide a non-transitory computer readable storage medium, wherein the storage medium stores computer instructions, when the computer instructions are executed by a processor, the computer executes a pipeline monitoring method based on smart gas pipeline network safety.

BRIEF DESCRIPTION OF THE ONE-STROKES

This description will be further explained in the form of exemplary embodiments, which will be described in detail by means of accompanying one-strokes. These embodiments are not restrictive, in which the same numbering indicates the same structure, wherein.

DETAILED DESCRIPTION

In order to more clearly explain the technical scheme of the embodiments of this disclosure, a brief description of the accompanying one-strokes required for the embodiment description is given below. Obviously, the accompanying one-strokes below are only some examples or embodiments of this description, and it is possible for ordinary technicians skilled in the art to apply this description to other similar scenarios according to these accompanying one-strokes without creative effort. Unless obviously obtained from the context or the context illustrates otherwise, the same numeral in the one-strokes refers to the same structure or operation.

Figure 1:
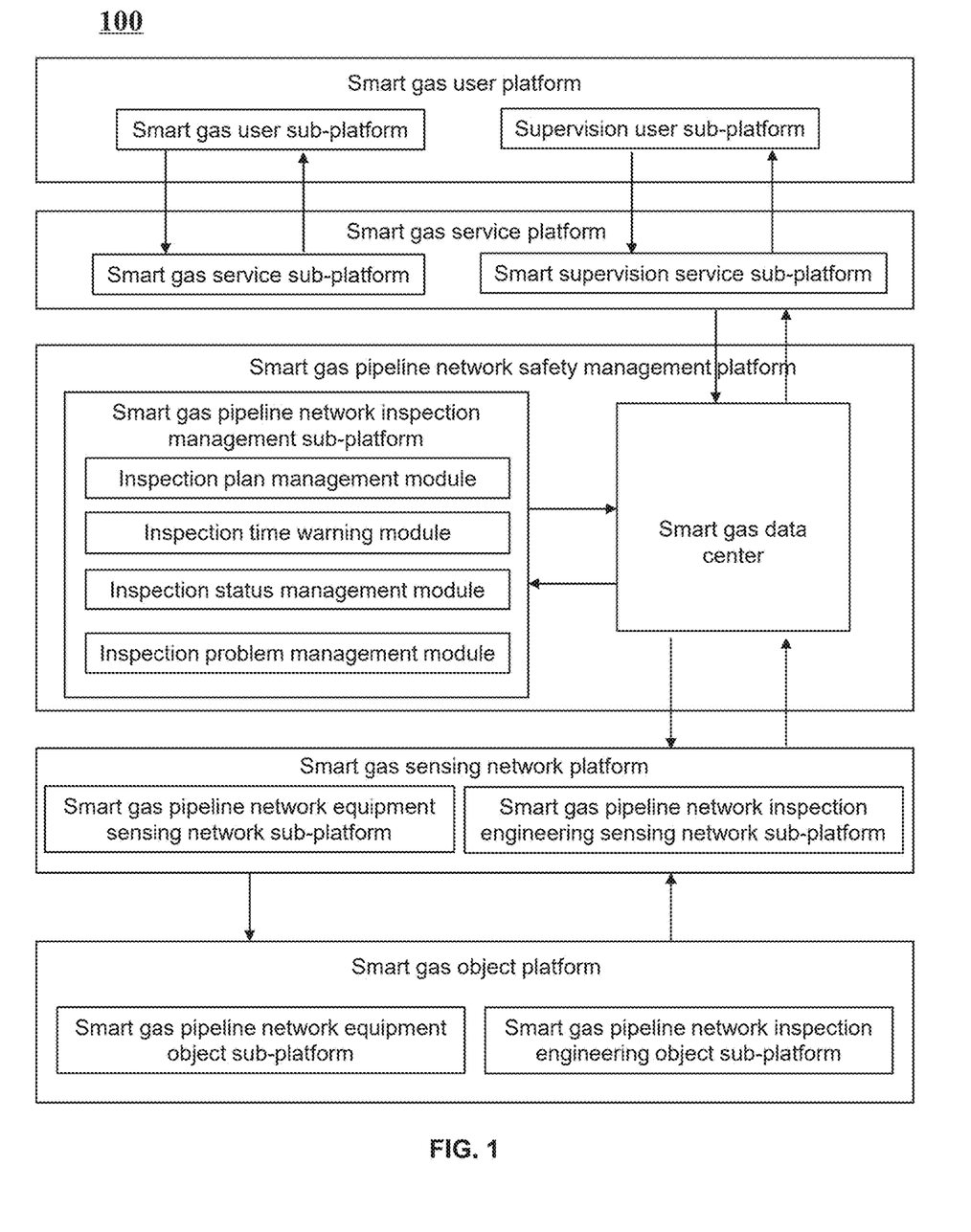
FIG. 1 is an exemplary schematic diagram illustrating a pipeline monitoring Internet of Things system based on smart gas pipeline network safety according to some embodiments of the present disclosure.

FIG. 1 is an exemplary schematic diagram illustrating a pipeline monitoring Internet of Things system based on smart gas pipeline network safety according to some embodiments of the present disclosure. In some embodiments, the pipeline monitoring Internet of Things system 100 based on the smart gas network safety may include a smart gas user platform, a smart gas service platform, a smart gas pipeline network safety management platform, a smart gas sensing network platform, and a smart gas object platform.

In some embodiments, the processing of information in the Internet of Things may be divided into a processing process for sensing information and a processing process for control information, which may be information generated based on sensing information. The sensing information is processed by the smart gas user platform to obtain the sensing information and pass the sensing information to the management platform. The control information is sent from the smart gas network safety management platform to the smart gas user platform, which in turn realizes the corresponding control.

The smart gas user platform may be a platform used to interact with a user. In some embodiments, the smart gas user platform may be configured as a terminal device, for example, the terminal device may include a mobile device, a tablet computer, etc., or any combination thereof. In some embodiments, the smart gas user platform may be used to feed the target pipeline segment to the user. In some embodiments, the smart gas user platform is set up with a gas user sub-platform and a supervision user sub-platform. The gas user sub-platform is for a gas user, and the gas user is the person who use gas. In some embodiments, the gas user sub-platform may receive the target pipeline segment to alert the gas user. For example, the gas user sub-platform may be used to alert a gas user that he/she may be affected by a deep pipeline inspection. The supervision user sub-platform is oriented towards a supervision user and supervises the operation of the entire pipeline monitoring Internet of Things system based on the smart gas pipeline network safety. The supervision user is the user of the security department. In some embodiments, the smart gas user platform may interact with the smart gas service platform in both directions downward. The target pipeline segment, etc. uploaded by the smart gas service platform is received, and pipeline network inspection and management-related information query instruction are issued to the smart gas data center, etc.

The smart gas service platform may be a platform for receiving and transmitting data and/or information. For example, the smart gas service platform may send the target pipeline segment to the smart gas user platform. In some embodiments, the smart gas service platform is set up with a smart gas service sub-platform and a smart supervision service sub-platform. The smart gas service sub-platform corresponds to the gas user sub-platform and provides services for the gas user to use gas safely. The smart supervision service sub-platform corresponds to the supervision user sub-platform, providing services for the safety supervision of the gas supervision user. In some embodiments, the smart gas service platform may interact downward with the smart gas network safety management platform in both directions, receive the target pipeline segment, etc., uploaded by the smart gas data center, and issue pipeline network inspection management-related information query instruction to the smart gas data center of the smart gas pipeline network safety management platform.

The smart gas pipeline network safety management platform may refer to the coordination of the connection and collaboration between the various functional platforms, converging all the information of the Internet of Things, and providing the platform of sensing management and control management functions for the Internet of Things operation system. For example, the smart gas pipeline network safety management platform may obtain the pipeline characteristics and the transportation characteristics of the gas pipeline segment in the preset area, etc.

In some embodiments, the smart gas pipeline network safety management platform is set up with a smart gas data center and a smart gas pipeline network inspection management sub-platform. The smart gas data center interacts with the smart gas network inspection management sub-platform in both directions. The smart gas pipeline network inspection management sub-platform obtains the pipeline characteristics and the transportation characteristics of the at least one gas pipeline segment in the preset area from the smart gas data center, and feeds back the corresponding remote control instruction. The smart gas pipeline network safety management platform interacts with the smart gas service platform and the smart gas sensing network platform through the smart gas data center. In some embodiments, the smart gas data center may receive the transportation characteristics uploaded by the sensing network platform and send the transportation characteristics to the smart gas network inspection management sub-platform for processing, and then send the aggregated, processed data to the smart gas service platform and/or the smart gas sensing network platform. In some embodiments, the smart gas pipeline network inspection management sub-platform of the smart gas pipeline network safety management platform is set up with an inspection plan management module, an inspection time warning module, an inspection status management module, and an inspection problem management module.

The smart gas sensing network platform may be a functional platform for the management of sensing communications. The smart gas sensing network platform may be configured as a communication network and gateway for network management, protocol management, command management and data parsing. In some embodiments, the smart gas sensing network platform may connect to the smart gas pipeline network safety management platform and the smart gas object platform to achieve the functions of sensing information sensing communication and control information sensing communication. For example, the smart gas sensing network platform may receive the remote control instruction from the smart gas data center and send the remote control instruction to the smart gas object platform.

The smart gas object platform may be a functional platform for sensing information generation. In some embodiments, the smart gas object platform may also have a smart gas pipeline network equipment object sub-platform and a smart gas pipeline network inspection engineering object sub-platform. The smart gas pipeline network equipment object sub-platform may include a pressure sensor, a flow meter, a temperature sensor, etc. The pressure sensor is used to obtain the actual transportation pressure within that gas pipeline segment; the flow meter is used to obtain the actual transportation flow rate of the gas pipeline segment; the temperature sensor is used to obtain the actual transportation temperature of this gas pipeline segment, etc. The smart gas pipeline network inspection engineering object sub-platform may include a crawling robot for deep inspection.

It should be noted that the smart gas user platform in this embodiment may be a desktop computer, tablet computer, laptop computer, cell phone or other electronic device capable of data processing and data communication, without being too limited here. It should be understood that the data processing process mentioned in this embodiment can be processed by the processor of the server, and the data stored in the server can be stored on the storage device of the server, such as hard disk and other memory. In specific applications, the smart gas sensing network platform may use multiple groups of gateway servers, or multiple groups of smart routers, without making too many limitations here. It should be understood that the data processing process mentioned in the embodiment of the present application can be processed by the processor of the gateway server, and the data stored in the gateway server can be stored on the storage device of the gateway server, such as hard disk, SSD and other memories.

In some embodiments of this present disclosure, the smart gas pipeline monitoring is implemented through the Internet of Things functional architecture of five platforms, completing the closed loop of information flow and making Internet of Things information processing more smooth and efficient.

Figure 2:
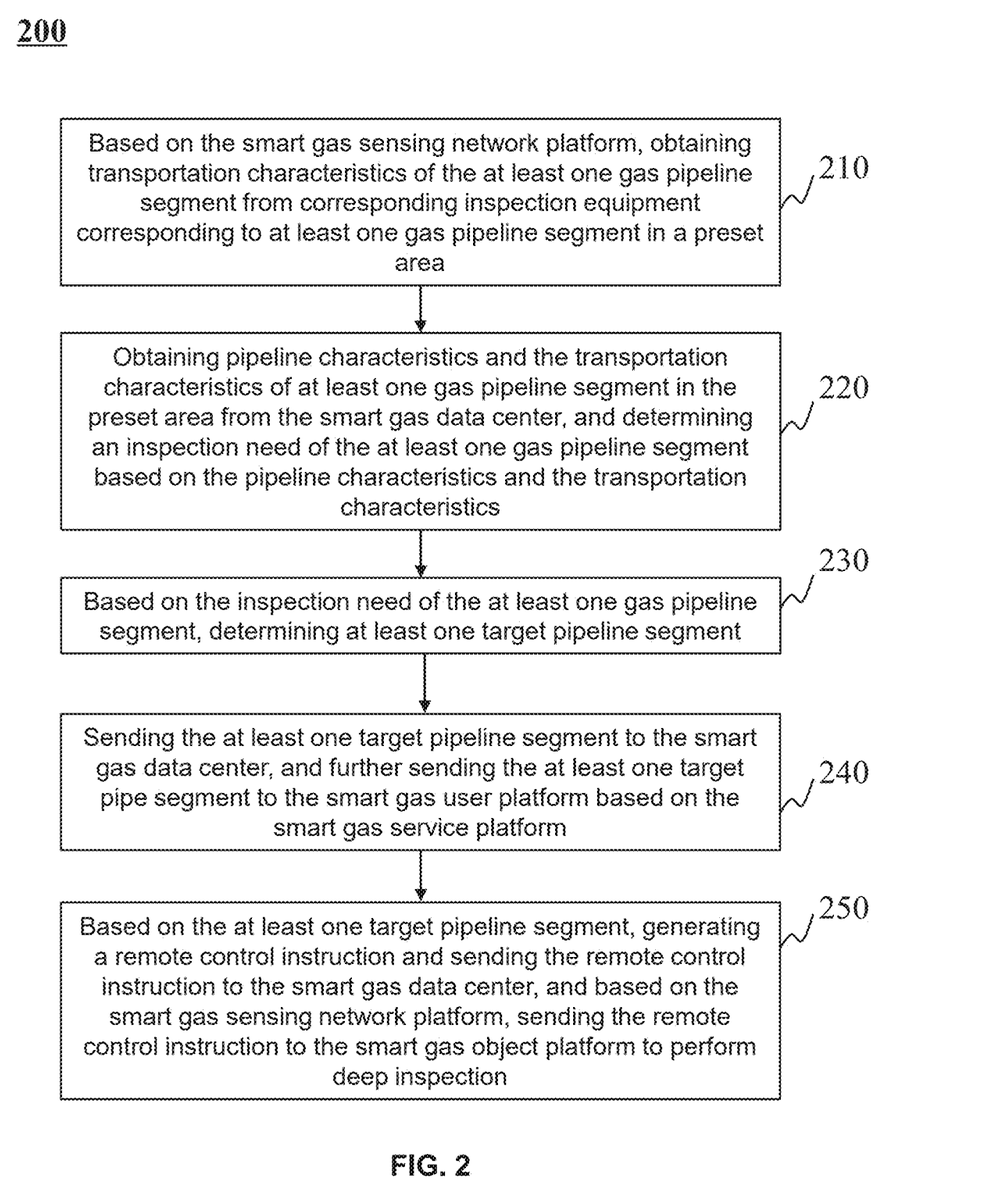
FIG. 2 is an exemplary flowchart illustrating a pipeline monitoring method based on smart gas pipeline network safety according to some embodiments of this present disclosure.

FIG. 2 is an exemplary flowchart illustrating a pipeline monitoring method based on smart gas pipeline network safety according to some embodiments of this present disclosure. As shown in FIG. 2, the process 200 includes the following steps. In some embodiments, the process 200 may be performed by the smart gas pipeline network safety management platform.

Step 210, based on the smart gas sensing network platform obtaining transportation characteristics of at least one gas pipeline segment from inspection equipment corresponding to the at least one gas pipeline segment in a preset area.

The preset area is the area where the gas pipeline segment to be inspected is located, and the preset area may include multiple gas pipeline segments. For example, the preset area may be the area where the gas pipeline segments of a neighborhood, a community, or an administrative district is located.

The gas pipeline segment is used for gas transmission, and the multiple gas pipeline segments may be connected for use. The inspection equipment is used to test various parameters of gas pipelines. The inspection equipment is configured in the smart city object platform. The inspection equipment may include a variety of types, for example, a pressure sensor, a flow meter, a temperature sensor and other equipment with inspection functions.

The transportation characteristics are the actual parameters related to the transportation of the gas pipeline segment (also referred to as actual transportation-related parameter) obtained by the inspection equipment. For example, the transportation characteristics may include an actual transportation pressure within the gas pipeline segment obtained through the pressure sensor corresponding to the gas pipeline segment; an actual transportation flow rate of the gas pipeline segment obtained through the flow meter; an actual transportation temperature of this gas pipeline segment obtained through the temperature sensor, etc. In some embodiments, the transportation characteristics may be represented by vectors. For example, a transportation characteristic vector=(a, b, c . . . ) may be constructed, and each element of the vector may represent an actual transportation-related parameter (e.g., a represents actual transportation pressure, b represents actual transportation flow, c represents actual transportation temperature, etc.).

In some embodiments, the smart gas data center may obtain real-time inspection parameters from the inspection equipment as transportation characteristics of the gas pipeline segment. For example, the smart gas data center may access the inspection parameters uploaded by the inspection equipment in real time through the smart gas service platform. In some embodiments, the smart gas data center may obtain transportation characteristics of the gas pipeline segment based on historical data over a predetermined time period (e.g., 10 days, 20 days, 30 days, etc.). For example, the smart gas data center may obtain historical inspection parameters for a gas pipeline segment over a 10-day period and use the average of the historical inspection parameters as the transportation characteristics of that gas pipeline segment.

Step 220, obtaining pipeline characteristics and the transportation characteristics of at least one gas pipeline segment in the preset area from the smart gas data center, and determining an inspection need of the at least one gas pipeline segment based on the pipeline characteristics and the transportation characteristics.

The pipeline characteristics are the rated parameters of the gas pipeline segment obtained based on the stored data in the smart gas data center. For example, the pipeline characteristics may include parameters such as transmission pressure (e.g., low pressure, medium pressure, sub-high pressure, high pressure), age (e.g., design age, service age, remaining age), etc. of the gas pipeline segment. In some embodiments, the pipeline characteristics may be represented by vectors. For example, a pipeline characteristic vector=(i, j, k . . . ) may be constructed, and each element in the vector may represent the rating parameters of one gas pipeline segment (e.g., i for low pressure rating, j for medium pressure rating, k for remaining years, etc.).

In some embodiments, the pipeline characteristics may be obtained based on historical data. For example, the pipeline characteristics may be obtained based on the factory parameters of the gas pipeline segment stored in the smart gas data center.

In some embodiments, the pipeline characteristics also include the environment in which the gas pipeline segment is located.

The environment where the gas pipeline segment is located is the actual environment where the gas pipeline segment is installed. The information on the environment in which the gas pipeline segment is located may include humidity, soil pH, road conditions, etc. The environment in which the gas pipeline segment is located may have an impact on the use of the gas pipeline segment. For example, the humidity and soil pH affect the corrosion degree of the gas pipeline segment. For example, if the pH value of the soil where the gas pipeline segment is located is low, it may deepen the corrosion of the gas pipeline segment. As another example, the road condition affects the probability of external damage to the gas pipeline segment. For example, when the road of the gas pipeline segment is frequently passed by trucks, the road damage is more serious and may increase the probability of external damage to the gas pipeline segment.

In some embodiments, the smart gas data center may manually obtain the environment in which the gas pipeline segment is located. For example, the environmental information entered by the user terminal may be obtained.

By using the environment in which the gas pipeline segment is located as the pipeline characteristics of the gas pipeline segment and fully considering the influence of environmental factors on the gas pipeline segment, the target pipeline segment may be determined more accurately.

The inspection need (also referred to as inspection need degree) is a value or letter etc. that reflects the degree of need for inspection of the gas pipeline segment. For example, the inspection need degree may be represented by a value between 1 and 100, the letters a-f, or a star rating. The higher the value, the former the letters sort, or the higher the star rating, the higher the maintenance processing priority.

In some embodiments, the smart gas pipeline network inspection management sub-platform may determine the inspection need degree for at least one gas pipeline segment based on pipeline characteristics and transportation characteristics. In some embodiments, the smart gas pipeline network inspection management sub-platform may manually preset correspondence rules between the pipeline characteristics as well as transportation characteristics and inspection need degree, and determine the inspection need degree based on the correspondence rules. For example, a comparison table of pipeline characteristics, transportation characteristics parameters and inspection need degree may be preset, and then the inspection need degree may be obtained by look-up of the pipeline characteristics and transportation characteristics in the comparison table. In some embodiments, the smart gas network inspection management sub-platform may determine the inspection need degree through the inspection need degree prediction model. For more details on the determination of the inspection need degree and model training through the inspection need degree prediction model, please refer to FIG. 3 and its related information.

Step 230, based on the inspection need of the at least one gas pipeline segment, determining at least one target pipeline segment.

The target pipeline segment is the segment of gas pipeline that needs to be inspected in depth. For more descriptions about the target pipeline segment can be found in the relevant descriptions of the gas pipeline segment.

In some embodiments, the smart gas pipeline network inspection management sub-platform may determine at least one target pipeline segment by presetting a threshold value for the inspection need degree. For example, for multiple gas pipeline segments A, B, C and D, the corresponding inspection need degrees are 66, 77, 85 and 91. When the threshold value of the inspection need degree is 80, gas pipeline segments C and D are determined to be the target pipeline segments.

Step 240, sending the at least one target pipeline segment to the smart gas data center, and further sending the at least one target pipeline segment to the smart gas user platform based on the smart gas service platform.

In some embodiments, the smart gas network inspection management sub-platform may send at least one target pipeline segment to the smart gas data center. For example, the smart gas pipeline network inspection management sub-platform may send information such as the number, location and inspection need degree of the target pipeline segment to the smart gas data center. In some embodiments, the target pipeline segment may be displayed on the user platform when it is further sent to the smart gas user platform based on the smart gas service platform. For example, it may be presented to the user (e.g., manager) based on the number of the target pipeline segment from small to large or the inspection need degree from high to low. As another example, it is possible to show the user (e.g., gas user) inspection reminders for a target pipeline segment.

Step 250, based on the at least one target pipeline segment, generating a remote control instruction and sending it to the smart gas data center, and based on the smart gas sensing network platform, sending the remote control instruction to the smart gas object platform to perform deep inspection.

The remote control instruction is the instruction used to control the deep inspection. In some embodiments, the remote control instruction may include, for example, controlling the crawling robot to perform a deep inspection, or dispatching a human to perform a deep inspection. In some embodiments, the remote control instruction may also include the number, location of the target pipeline segment, etc.

The deep inspection is an in-depth inspection of the interior of the gas pipeline. In deep inspection based on the crawling robot, the crawling robot may attach itself to the inner wall of the pipeline and travel through structures such as suction cups or magnetic materials. At the same time, the crawling robot may walk based on a remote control or automatic based on a built-in program set in advance. In some embodiments, the crawling robot may be fitted with infrared devices, cameras, etc., for detecting the condition of the inner wall of the pipeline (e.g., corrosion of the inner wall); and various sensors may also be installed in the crawling robot to monitor gas pressure, flow rate, temperature, etc. in the pipeline.

In some embodiments, the smart gas pipeline network inspection management sub-platform may generate the remote instruction based on the location of the at least one target pipeline segment. In some embodiments, the remote control instruction may include a manual inspection route. The smart gas network inspection management sub-platform may determine the manual inspection route based on the at least one target pipeline segment.

In some embodiments, the remote control instruction may also include a target inspection route for the crawling robot. The smart gas pipeline network inspection management sub-platform may determine the target inspection route of the crawling robot based on the at least one target pipeline segment.

The target inspection route is the shortest inspection route for the crawling robot to conduct a deep inspection of the at least one target pipeline segment. For example, the target inspection route may be to start from the target pipeline segment B, pass through the target pipeline segments A, D and C in turn, and end at the target pipeline segment E.

In some embodiments, the smart gas pipeline network inspection management sub-platform may determine a target inspection route for the crawling robot based on the at least one target pipeline segment. For example, the smart gas pipeline network inspection management sub-platform may determine the inspection order of target pipeline segments by presetting or ranking them from highest to lowest based on the inspection need degrees. The greedy algorithm is then used to obtain the route of the crawling robot going to each target pipeline segment in turn, thereby determining the target inspection route. As another example, the smart gas network inspection management sub-platform may also build a pipeline graph and then determine the target inspection route through a one-stroke algorithm. For more detailed descriptions about the target inspection route based on the pipeline graph, please refer to FIG. 4 and FIG. 5 and their related descriptions. It should be noted that when determining the target inspection route, the optimal or better solution of the shortest inspection route obtained may be used as the target inspection route.

Based on the at least one target pipeline segment, the target inspection route of the crawling robot is determined, which enables the crawling robot to conduct a deep inspection according to the inspection need degree and crawl a relatively optimal route.

In some embodiments, the crawling robot may arrive at the standby position earlier based on the time of the remote control instruction. When the inspection time is reached, an operation for inspection along the target inspection route is triggered.

Some embodiments of this present disclosure determine the inspection need degree for the at least one gas pipeline segment based on the pipeline characteristics and transportation characteristics, and thus determine the at least one target pipeline segment and perform a deep inspection of the at least one target pipeline segment. Deep inspection of the pipeline segment that urgently needs inspection can be conducted, effectively reducing the possibility of potential hazards and achieving better gas pipeline monitoring results.

Figure 3:
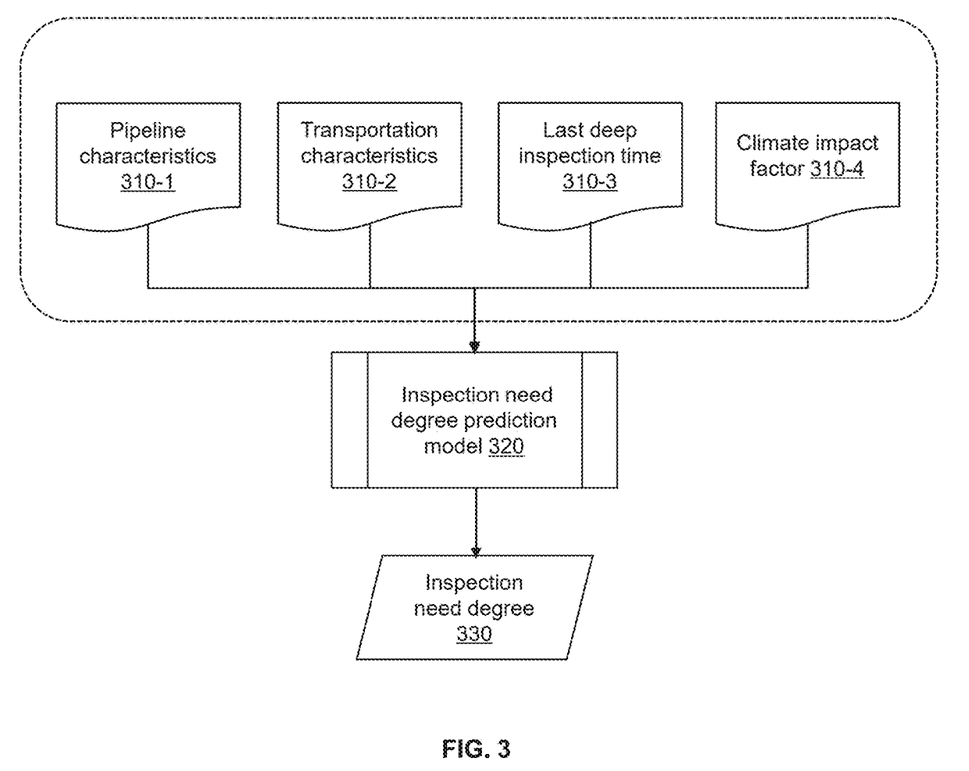
FIG. 3 is an exemplary schematic diagram illustrating an inspection need degree prediction model according to some embodiments of the present disclosure.

FIG. 3 is an exemplary schematic diagram illustrating an inspection need degree prediction model according to some embodiments of the present disclosure.

In some embodiments, the smart gas pipeline network inspection management sub-platform may predict the inspection need degree of the at least one gas pipeline segment by an inspection need degree prediction model based on pipeline characteristics and transportation characteristics.

In some embodiments, the inspection need degree prediction model 320 may be a machine learning model, as shown in FIG. 3. In some embodiments, the inspection need degree prediction model 320 may be a deep learning neural network model. The exemplary deep learning neural network models may include Convolutional Neural Networks (CNN), Deep Neural Networks (DNN), etc., or a combination thereof.

In some embodiments, as shown in FIG. 3, the inputs to the inspection need degree prediction model 320 may include pipeline characteristics 310-1 and transportation characteristics 310-2. The input pipeline characteristics 310-1 and the transportation characteristics 310-2 may be transportation characteristics vectors and pipeline characteristics vectors. In some embodiments, the output of the inspection need degree prediction model 320 may include an inspection need degree 330. For more details about the pipeline characteristics, transportation characteristics and inspection need degree, please refer to FIG. 2 and its related description.

In some embodiments, as shown in FIG. 3, the input of the inspection need degree prediction model 320 also includes the last deep inspection time 310-3 for the at least one gas pipeline segment.

In some embodiments of this present disclosure, the smart gas pipeline network inspection management sub-platform takes into account the effect of the last deep inspection time of at least one gas pipeline segment when determining the inspection need degree through the inspection need degree prediction model. The gas pipeline segment with a long interval from the last deep inspection may be inspected in priority to make the determined inspection need degree more accurate.

In some embodiments, as shown in FIG. 3, the input to the inspection need degree prediction model 320 also includes a climate impact factor 310-4. The climate impact factor 310-4 may be determined based on future weather conditions for at least one gas pipeline segment and the depth at which the pipeline is buried.

The climate impact factor is a climate-related factor that affects the pipeline segment. In some embodiments, the climate impact factor may be related to future weather conditions in at least one gas pipeline segment and the depth of burial of the pipeline. For example, when heavy rain is about to fall in the area where a pipeline segment is located, and that pipeline segment is buried at a shallow depth, the pipeline segment may be affected.

In some embodiments, the smart gas pipeline network inspection management sub-platform may obtain the future weather conditions in the area where the pipeline segment is located through the weather forecast platform, and obtain the burial depth of the pipeline segment through the design drawings and construction drawings related to the installation of the pipeline network. From there, the climate impact factor is determined based on future weather conditions and burial depth of the pipeline. For example, the climate impact factor may be expressed as a rank. The climate impact factor level may be set to "Level 1" for poor future weather conditions (e.g., rainfall and acid rain) and shallow burial depths of a pipeline. The climate impact factor level for poor future weather conditions and deep pipeline burial is set to "Level 2". The climate impact factor level is set to "Level 3" for good future weather conditions (e.g., sunny days, etc.) and deep burial of pipelines.

In some embodiments of this present disclosure, the smart gas pipeline network inspection management sub-platform may predict the inspection need degree of a pipeline segment more accurately based on the climate impact factor and through the inspection need degree prediction model. The closer the pipeline is to the ground, the more likely it is to be affected by weather. Therefore, if the future weather in the area where the pipeline segment is located is relatively severe, the inspection need degree of this pipeline segment is increased accordingly to ensure the accuracy of the inspection need degree.

Figure 4:
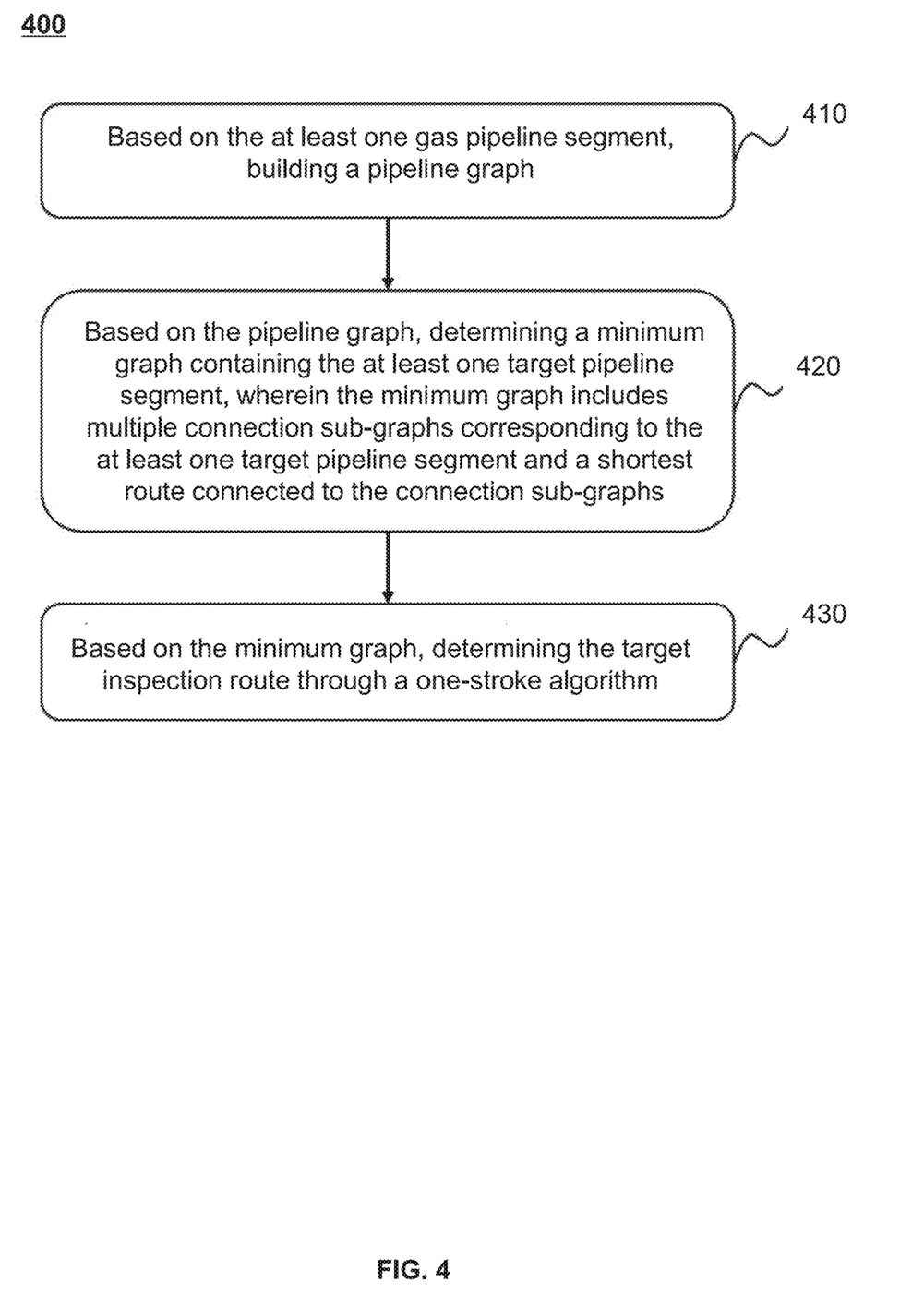
FIG. 4 is an exemplary flowchart illustrating a method for determining a target inspection route for a crawling robot according to some embodiments of this present disclosure.

In some embodiments, as shown in FIG. 4, the inspection need degree prediction model may be obtained by training. For example, a training sample is input to the initial inspection need degree prediction model, a loss function is built based on the labels and the output of the initial inspection need degree prediction model, and the parameters of the initial inspection need degree prediction model are updated. The model training is completed when the loss function of the initial inspection need degree prediction model meets the preset condition, and the trained inspection need degree prediction model is obtained. The pretest condition may be that the loss function converges, the number of iterations reaches a threshold of iterations, etc.

In some embodiments, the training sample may include a positive sample and a negative sample. The positive sample is the sample pipeline characteristics and sample transportation characteristics of the pipeline segments that are found to have faults after deep inspection in the historical data, or the sample pipeline characteristics and sample transportation characteristics of the pipeline segments that have not been inspected in depth in the historical data and have faults in a short period of time (e.g., a period of time less than a time threshold, which may be 10 days, 20 days, 30 days, etc.) in the future.

The label value of the positive sample may be calibrated to a value from zero to one depending on the extent of the fault, or the specific time of the "shorter time period". For example, the repair time of a fault may be used to characterize the extent of the fault; the longer the repair time of a fault, the higher the extent of the fault. The repair time of the fault is zero hour to two hours corresponding to a label value of 0.1, the repair time of the fault is two hours to four hours corresponding to a label value of 0.2, etc. As another example, the shorter time period of zero to two days corresponds to a label value of one, the shorter time period of three to five days corresponds to a label value of 0.9, etc. The negative sample is the sample pipeline characteristics and sample transportation characteristics corresponding to the pipeline segment that is found to be normal after the deep inspection in the historical data, or the sample pipeline characteristics and sample transportation characteristics corresponding to the pipeline segment that is not inspected in depth in the historical data and is normal for a longer period of time in the future (e.g., a period of time greater than the time threshold, which may be 30 days, 60 days, 100 days, etc.). The label value of the negative sample may be directly labeled as zero.

In some embodiments, when the inputs to the inspection need degree prediction model 320 also include the last deep inspection time 310-3 and/or the climate impact factor 310-4. Correspondingly, the training sample may also include the sample's last deep inspection time and/or the sample's climate impact factor.

In some embodiments of this present disclosure, the smart gas pipeline network inspection management sub-platform may quickly and accurately predict the inspection need degree of a pipeline segment through an inspection need degree prediction model based on pipeline characteristics and transportation characteristics. This helps the smart gas pipeline network inspection management sub-platform to conduct deep inspection for target pipeline segment that urgently needs deep inspection according to the inspection need degree. In addition, the inspection need degree predicted by the inspection need degree prediction model is made more accurate by inputting the last deep inspection time and/or climate impact factor.

FIG. 4 is an exemplary flowchart illustrating a method for determining a target inspection route for a crawling robot according to some embodiments of this present disclosure. As shown in FIG. 4, the process 400 includes the following steps. In some embodiments, the process 400 may be performed by the smart gas network inspection management sub-platform.

Step 410, based on the at least one gas pipeline segment, building a pipeline graph.

The pipeline graph may reflect the pipeline structure.

Figure 5:
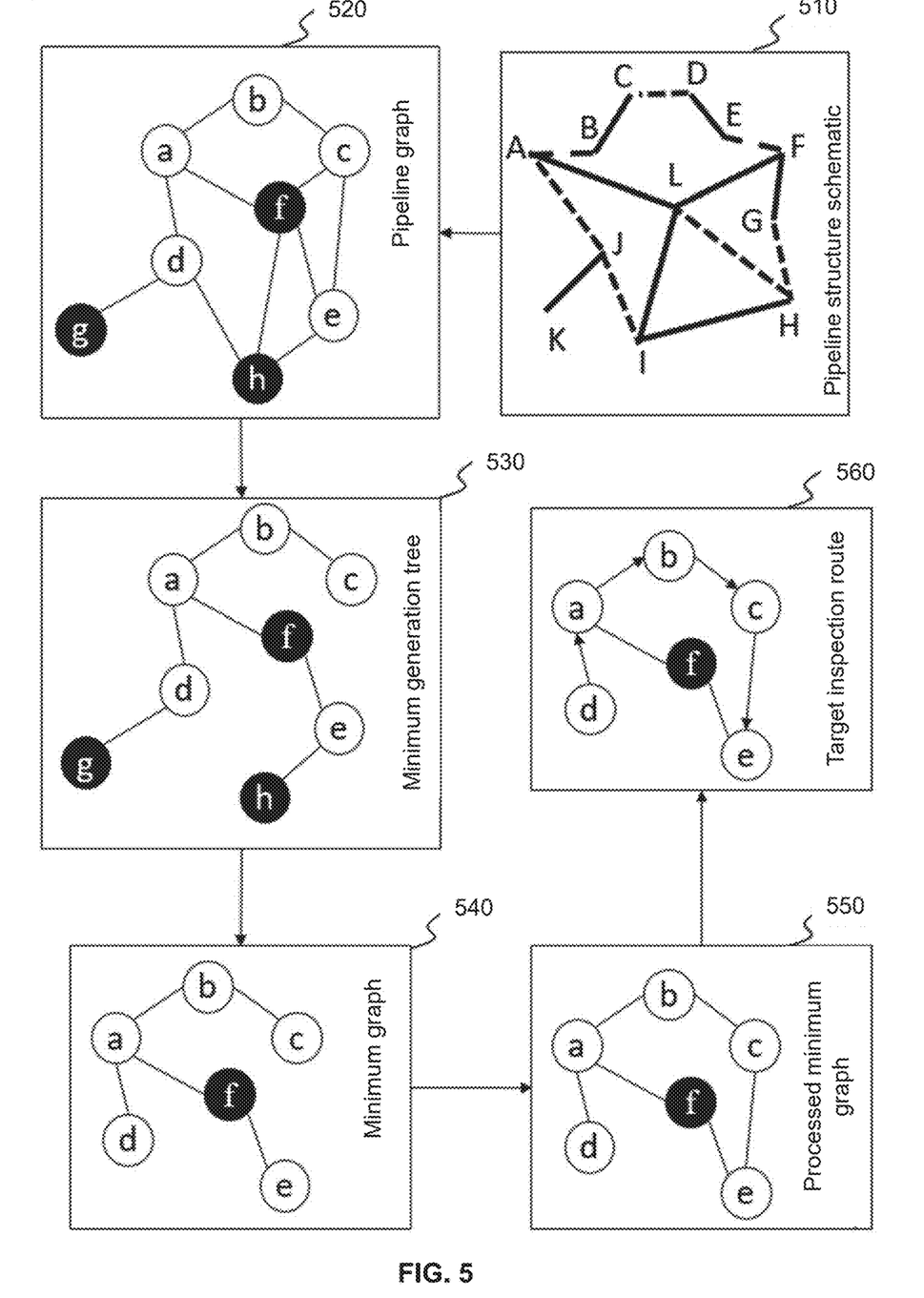
FIG. 5 is an exemplary schematic diagram for determining a target inspection route for a crawling robot according to some embodiments of the present disclosure.

Taking FIG. 5 as an example, the dashed lines (e.g., pipeline section AB, pipeline section CD, etc.) in the pipeline structure schematic 510 are pipelines to be inspected, and the solid lines (e.g., pipeline segment AL, pipeline segment FL, etc.) are not-to-be-inspected pipelines. The pipeline graph 520 may be constructed based on the pipeline structure schematic 510.

The pipeline graph may include nodes and edges. In some embodiments, the nodes may include a pipeline node to be inspected and a non-pipeline node to be inspected. For example, in the pipeline graph 520, the white nodes (e.g., node a, node b, node c) represent pipeline nodes to be inspected and the black nodes (e.g., node f, node g, node h) represent not-to-be-inspected pipeline nodes. In some embodiments, the edges may be used for a connection between a pipeline node to be inspected and a not-to-be-inspected node. The characteristic of the edge is the length of the pipeline segment. For example, the edge connecting node e with node c reflects the length of the pipeline between the two nodes.

In some embodiments, the smart gas pipeline network inspection management sub-platform may construct a pipeline graph by transformation rules based on at least one gas pipeline segment. As shown in FIG. 5, the transformation rules include abstracting the intersection of the presence of branches (i.e., at least three edges) as a not-to-be-inspected pipeline node. For example, pipeline segment AL, pipeline segment FL, pipeline segment IL and pipeline segment HL exist at the intersection L, which may be abstracted as node f. Each connected pipeline segment to be inspected as a whole is abstracted as a pipeline node to be inspected. For example, the pipeline segment GH to be inspected is connected to the pipeline segment LH to be inspected, which may be abstracted as a whole as the pipeline node e to be inspected. The end of the non-pipeline segment to be inspected (no longer connected to other pipelines) is abstracted as a non-pipeline node to be inspected. For example, a pipeline segment KJ is no longer connected to other pipeline segments and may be abstracted at its end as a not-to-be-inspected pipeline node g.

Step 420, based on the pipeline graph, determining a minimum graph containing the at least one target pipeline segment, wherein the minimum graph includes multiple connection sub-graphs corresponding to the at least one target pipeline segment and a shortest route connected to the connection sub-graphs.

The connection sub-graph of the minimum graph is a sub-graph composed of pipeline nodes to be inspected that may be connected to each other in the minimum graph, and each pipeline node to be inspected corresponds to a target pipeline segment. The shortest route is the one that is the shortest among all the routes that can make the connection sub-graphs connected.

In some embodiments, the smart gas pipeline network inspection management sub-platform may determine a minimum generation tree by a minimum generation tree algorithm based on the pipeline graph, and based on the minimum generation tree, determine a minimum graph.

The generation tree is a connected graph that contains all nodes in the pipeline graph and does not have a closed loop. The minimum generation tree is the one with the smallest sum of the weights of the edges among the multiple generation trees corresponding to the pipeline graph. In some embodiments, the weights of the edges may be determined based on the characteristics of the edges, i.e., the lengths of the pipeline segments. The longer the length of the pipeline segment is, the greater the weight is. For example, a comparison table including pipeline segment lengths and weights may be preset, and the weights of the edges may be determined by looking up the table. Taking FIG. 5 as an example, the minimum generation tree 530 includes all nodes in the pipeline graph 520 and does not have a closed loop. Among the multiple generation trees corresponding to the pipeline graph 520, the sum of the weights of the edges in the minimum generation tree 530 is the smallest.

The minimum generation tree algorithm is used to determine the minimum generation tree. The minimum generation tree algorithm may include multiple feasible algorithms, such as the Prim algorithm, Kruskal algorithm, etc.

In some embodiments, the smart gas network inspection management sub-platform may determine neighboring nodes that correspond to nodes with the smallest weights and do not form a closed loop, and make them connected, thereby forming a minimum generation tree, by means of the Prim algorithm or Kruskal algorithm.

In some embodiments, the smart gas network inspection management sub-platform may use the obtained minimum generation tree as the minimum graph.

In some embodiments, the smart gas network inspection management sub-platform may prune the minimum generation tree and determine the pruned graph as the minimum graph.

The pruning is the operation of removing non-to-be-inspected pipeline nodes and their connected edges. In some embodiments, it may be determined whether a non-to-be-inspected pipeline node can be pruned by determining whether at least one of the remaining connection sub-graphs, after removing the non-to-be-inspected pipeline nodes and its connected edges, includes all of the pipeline nodes to be inspected. Taking FIG. 5 as an example, the non-to-be-inspected pipeline nodes f, g, h and the corresponding edges are included in the minimum generation tree 530. After removing node g and node h and the edges connecting them, the remaining connection sub-graph consists of a connection sub-graph including all pipeline nodes a, b, c, d and e to be inspected. Therefore, the node g and node h may be pruned. And after removing node f and its connected edges, the remaining connection sub-graph does not include a connection sub-graph that includes all pipeline nodes a, b, c, d and e to be inspected. Therefore, the node f cannot be pruned.

By determining the minimum generation tree through the minimum generation tree algorithm and pruning the minimum generation tree, the minimum graph may be determined, which helps to obtain the optimal inspection route.

Step 430, based on the minimum graph, determining the target inspection route through a one-stroke algorithm.

The one-stroke algorithm is an algorithm used to determine a count of odd points N in the minimum graph and thus determine whether the minimum graph can be drawn in one stroke without duplicate line segments.

The count of odd points N is the count of odd points in the minimum graph. The odd point is a node that is connected with an odd number of edges. For example, there are three edges connected by node a in the minimum graph 540, and node a is an odd point in the minimum graph 540. Besides, node c, node d, and node e are connected with an edge, i.e., node c, node d, and node e are also odd points of the minimum graph 540. Therefore, the count of odd points of the minimum graph 540 is four.

In some embodiments, in response to the count of odd points N in the one-stroke algorithm being zero, the smart gas network inspection management sub-platform may determine that the minimum graph can be drawn in one stroke without repeated line segments, and thus determine the target inspection route. Specifically, the starting and ending points of the target inspection route may be determined to be the same node of any nodes.

In some embodiments, in response to the count of odd points N in the one-stroke algorithm being two, the smart gas network inspection management sub-platform may determine that the minimum graph can be drawn in one stroke without repeated line segments, and thus determine the target inspection route. Specifically, the starting and ending points of the target inspection route may be determined as two odd points.

In some embodiments, the smart gas network inspection management sub-platform may further, in response to the count of odd points N in the one-stroke algorithm greater than two, determine the processed minimum graph by matching the odd points and connecting the matched odd points with a connection line; based on the processed minimum graph, determine the target inspection route.

The principle of the matching may include determining a target inspection route based on the characteristics of the edges of the minimum graph and/or the last deep inspection time of at least one gas pipeline segment. For example, if the distance between node a and node d is 30 meters, and the distance between node c and node e is 25 meters, there is no "existing gas pipeline segment" or "new gas pipeline segment" to connect node d and node e, and node d and node c. Therefore, the node c and node e having the closer distance may be chosen to be connected. As another example, if the last deep inspection time intervals for node a, node c, node d and node e are 15 days, three months, one month and six months, respectively, then node c and node e, which have relatively long deep inspection time interval, may be connected as matching pairs, and the result of the matching connection is shown in the processed minimum graph 550.

The connection lines are used to connect the matching odd points. For example, in the processed minimum graph 550, node c is connected to node e with a connection line, indicating that node c is matched with node e.

In some embodiments, in response to the count of odd points N in the one-stroke algorithm greater than two, the smart gas network inspection management sub-platform may match N odd points or N−2 odd points two by two based on the matching principle, and the matched odd points are connected again with the original route as the edge, and thus the target inspection route may be determined. A route where the matched odd points are connected again is a duplicate route. For example, after matching N odd points, the count of odd points in the processed minimum graph is zero. The smart gas pipeline network inspection management sub-platform may determine the target inspection route based on the above method of determining the target inspection route where the count of odd points N is zero. As another example, after matching N−2 odd points, the count of odd points in the processed minimum graph is two. The smart gas pipeline network inspection management sub-platform may determine the target inspection route based on the above method of determining the target inspection route with the count of odd points N as two. Taking FIG. 5 as an example, the processed minimum graph 550 includes two odd points, and the smart gas network inspection management sub-platform may determine the target inspection route based on the method of determining the count of odd points N as two. Taking node d as the starting point and node e as the end point, the smart gas network inspection management sub-platform may determine at least one route drawn in one stroke without repeated line segments from the starting point to the end point (i.e., node d node a→node b→node c→node e) as the target inspection route 560.

The optimal inspection route may be obtained by adding gas pipeline segments with short lengths and long intervals from the last deep inspection when performing matching.

Some embodiments of this present disclosure determine the minimum graph based on the pipeline graph, and further determines the target inspection route by the one-stroke algorithm. The optimal inspection route may be obtained, thus improving efficiency and saving energy.

This present disclosure includes a non-transitory computer readable storage medium, the storage medium stores computer instructions, and when the computer instructions are executed by a processor, a pipeline monitoring method based on smart gas pipeline network safety is implemented.

Finally, it should be understood that the embodiments described herein are only configured to illustrate the principles of the embodiments of the present disclosure. Other variants may also belong to the scope of this disclosure. Accordingly, by way of example and not limitation, alternative configurations of the embodiments of this disclosure may be considered consistent with the instruction of this disclosure. Accordingly, the embodiments of this disclosure are not limited to those expressly introduced and described in this disclosure.

What is claimed is:

1. A pipeline monitoring method based on smart gas pipeline network safety, which is implemented based on a pipeline monitoring Internet of Things system, the Internet of Things system comprising a smart gas user platform, a smart gas service platform, a smart gas pipeline network safety management platform, a smart gas sensing network platform and a smart gas object platform interacting in sequence, wherein the smart gas pipeline network safety management platform comprises a smart gas data center and a smart gas pipeline network inspection management sub-platform, the method being performed by the smart gas pipeline network safety management platform, comprising:
   by the smart gas data center, obtaining, based on the smart gas sensing network platform, transportation characteristics of at least one gas pipeline segment from inspection equipment corresponding to the at least one gas pipeline segment in a preset area, wherein the gas inspection equipment is configured in the smart gas object platform;
   by the smart gas pipeline network inspection management sub-platform,
   obtaining pipeline characteristics and the transportation characteristics of the at least one gas pipeline segment in the preset area from the smart gas data center, and determining an inspection need of the at least one gas pipeline segment based on the pipeline characteristics and the transportation characteristics;
   based on the inspection need of the at least one gas pipeline segment, determining at least one target pipeline segment;
   sending the at least one target pipeline segment to the smart gas data center, and further sending the at least one target pipeline segment to the smart gas user platform based on the smart gas service platform; and
   based on the at least one target pipeline segment, generating a remote control instruction and sending the remote control instruction to the smart gas data center, and based on the smart gas sensing network platform, send the remote control instruction to the smart gas object platform to perform deep inspection, wherein the deep inspection is an inspection of an interior of a gas pipeline.

2. The pipeline monitoring method of claim 1, wherein the pipeline characteristics include an environment where the at least one gas pipeline segment is located.

3. The pipeline monitoring method of claim 1, wherein the determining an inspection need of the at least one gas pipeline segment based on the pipeline characteristics and the transportation characteristics includes:
   based on the pipeline characteristics and the transportation characteristics, predicting the inspection need of the at least one gas pipeline segment through an inspection need degree prediction model, wherein the inspection need degree prediction model is a machine learning model.

4. The pipe monitoring method of claim 3, wherein an input of the inspection need degree prediction model includes a last deep inspection time of the at least one gas pipeline segment.

5. The pipeline monitoring method of claim 3, wherein the input of the inspection need degree prediction model includes a climate impact factor, which is determined based on future weather conditions of the at least one gas pipeline segment and a depth of a buried pipeline segment.

6. The pipeline monitoring method of claim 1, wherein the generating a remote control instruction and sending the remote control instruction to the smart gas data center based on the at least one target pipeline segment, and the sending the remote control instruction to the smart gas object platform to perform deep inspection based on the smart gas sensing network platform include:
   based on the at least one target pipeline segment, determining a target inspection route of a crawling robot; and
   based on the target inspection route, generating a remote control instruction and sending the remote control instruction to the smart gas data center, and based on the smart gas sensing network platform, sending the remote control instruction to the smart gas object platform to perform deep inspection.

7. The pipeline monitoring method of claim 6, wherein the determining the target inspection route of the crawling robot based on the at least one target pipeline segment includes:
   based on the at least one gas pipeline segment, building a pipeline graph;
   based on the pipeline graph, determining a minimum graph containing the at least one target pipeline segment, wherein the minimum graph includes multiple connection sub-graphs corresponding to the at least one target pipeline segment and a shortest route connected to the connection sub-graphs; and
   based on the minimum graph, determining the target inspection route through a one-stroke algorithm.

8. The pipeline monitoring method of claim 7, wherein the determining the minimum graph containing the at least one target pipeline segment based on the pipeline graph includes:
   based on the pipeline graph, determining a minimum generation tree through a minimum tree algorithm; and
   based on the minimum generation tree, determining the minimum graph.

9. The pipeline monitoring method of claim 8, wherein the determining the minimum graph based on the minimum generation tree includes:
   pruning the minimum generation tree, and determining a graph after the pruning as the minimum graph.

10. The pipeline monitoring method of claim 7, wherein the determining the target inspection route through a one-stroke algorithm based on the minimum graph includes:
in response to a count of odd points of the one-stroke algorithm greater than 2,
matching the odd points and using a connection line to connect the matched odd points, so as to determine a processed minimum graph, wherein the connection line includes the existing gas pipeline segment or a newly added gas pipeline segment in the minimum graph, a principle of the matching includes determining the target inspection route based on characteristics of edges of the minimum graph and/or the last deep inspection time of the at least one gas pipeline segment; and
based on the processed minimum graph, determining the target inspection route.

11. A non-transitory computer readable storage medium, wherein the storage medium stores computer instructions, when the computer instructions are executed by a processor, the pipeline monitoring method of claim 1 is implemented.

12. A pipeline monitoring Internet of Things system based on smart gas pipeline network safety, wherein the Internet of Things system comprises a smart gas user platform, a smart gas service platform, a smart gas pipeline network safety management platform, a smart gas sensing network platform and a smart gas object platform interacting in sequence, the smart gas pipeline network safety management platform includes a smart gas data center and a smart gas pipeline network inspection management sub-platform, wherein
the smart gas data center is configured to obtain, based on the smart gas sensing network platform, transportation characteristics of at least one gas pipeline segment from inspection equipment corresponding to the at least one gas pipeline segment in a preset area, wherein the gas inspection equipment is configured in the smart gas object platform; and
the smart gas pipeline network inspection management sub-platform is configured to:
obtain pipeline characteristics and the transportation characteristics of the at least one gas pipeline segment in the preset area from the smart gas data center, and determine an inspection need of the at least one gas pipeline segment based on the pipeline characteristics and the transportation characteristics;
based on the inspection need of the at least one gas pipeline segment, determine at least one target pipeline segment;
send the at least one target pipeline segment to the smart gas data center, and further send the at least one target pipeline segment to the smart gas user platform based on the smart gas service platform; and
based on the at least one target pipeline segment, generate a remote control instruction and send the remote control instruction to the smart gas data center, and based on the smart gas sensing network platform, send the remote control instruction to the smart gas object platform to perform deep inspection, wherein the deep inspection is an inspection of an interior of a gas pipeline.

13. The pipeline monitoring Internet of Things of claim 12, wherein the pipeline characteristics include an environment where the gas pipeline segment is located.

14. The pipeline monitoring Internet of Things of claim 12, wherein the determining an inspection need of the at least one gas pipeline segment based on the pipeline characteristics and the transportation characteristics includes:
based on the pipeline characteristics and the transportation characteristics, predicting the inspection need of the at least one gas pipeline segment through an inspection need degree prediction model, wherein the inspection need degree prediction model is a machine learning model.

15. The pipeline monitoring Internet of Things of claim 14, wherein an input of the inspection need degree prediction model includes a last deep inspection time of the at least one gas pipeline segment.

16. The pipeline monitoring Internet of Things of claim 15, wherein the input of the inspection need degree prediction model includes a climate impact factor, which is determined based on future weather conditions of the at least one gas pipeline segment and a depth of a buried pipeline segment.

17. The pipeline monitoring Internet of Things of claim 12, wherein the generating a remote control instruction and sending the remote control instruction to the smart gas data center based on the at least one target pipeline segment, and the sending the remote control instruction to the smart gas object platform to perform deep inspection based on the smart gas sensing network platform include:
based on the at least one target pipeline segment, determining a target inspection route of a crawling robot; and
based on the target inspection route, generating a remote control instruction and sending the remote control instruction to the smart gas data center, and based on the smart gas sensing network platform, sending the remote control instruction to the smart gas object platform to perform deep inspection.

18. The pipeline monitoring Internet of Things system of claim 17, wherein the determining the target inspection route of the crawling robot based on the at least one target pipeline segment includes:
based on the at least one gas pipeline segment, building a pipeline graph;
based on the pipeline graph, determining a minimum graph containing the at least one target pipeline segment, wherein the minimum graph includes multiple connection sub-graphs corresponding to the at least one target pipeline segment and a shortest route connected to the connection sub-graphs; and
based on the minimum graph, determining the target inspection route through a one-stroke algorithm.

19. The pipeline monitoring Internet of Things system of claim 18, wherein the determining the minimum graph containing the at least one target pipeline segment based on the pipeline graph includes:
based on the pipeline graph, determining a minimum generation tree through a minimum tree algorithm; and
based on the minimum generation tree, determining the minimum graph.

20. The pipeline monitoring Internet of Things system of claim 19, wherein the determining the minimum graph based on the minimum generation tree includes:
pruning the minimum generation tree, and determining a graph after the pruning as the minimum graph.

* * * * *